Figure 1:
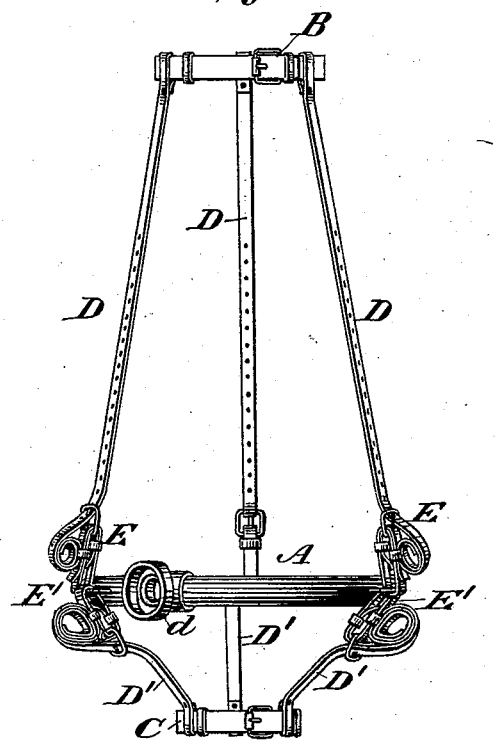

(No Model.)

H. M. CHRISTOPHER.
SHOWER BATH APPARATUS.

No. 531,303. Patented Dec. 25, 1894.

WITNESSES:
Jacob P. Brown.
Nicholas M. Goodlett Jr.

INVENTOR
Henry M. Christopher

BY
Witter & Kenyon
his ATTORNEYS

UNITED STATES PATENT OFFICE.

HENRY M. CHRISTOPHER, OF NEW YORK, N. Y.

SHOWER-BATH APPARATUS.

SPECIFICATION forming part of Letters Patent No. 531,303, dated December 25, 1894.

Application filed November 28, 1893. Serial No. 492,246. (No model.)

*To all whom it may concern:*

Be it known that I, HENRY M. CHRISTOPHER, a subject of the Queen of Great Britain, residing in the city, county, and State of New York, have invented a new and useful Improvement in Shower-Bath Apparatus, of which the following, taken in connection with the accompanying drawings, is a specification.

My invention in its entirety relates to a shower bath apparatus designed especially to be used in bathing the leg of an animal, whether man or beast. Certain features of it, however, are adapted to be used generally for the purpose of providing a shower bath, whether the bath is to be given locally to the leg, or to some other part of the body or to the entire body.

The invention consists of a perforated pipe for delivering water in a spray provided with supports especially adapted and arranged to be attached to the body of an animal and support the water pipe near its leg for effectually bathing the leg without the special and continuous care of an attendant.

In the form of the invention shown in the drawings and hereinafter specifically described the water pipe is arranged to extend around or encircle the leg of the animal, so that water may be directed upon several sides of the leg at once if desired, and the supports for the pipe are made adjustable and especially devised for attachment to the animal's leg.

Figure 3:
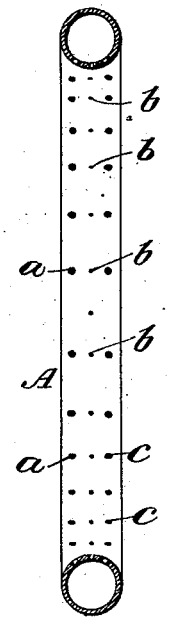
Figure 2:
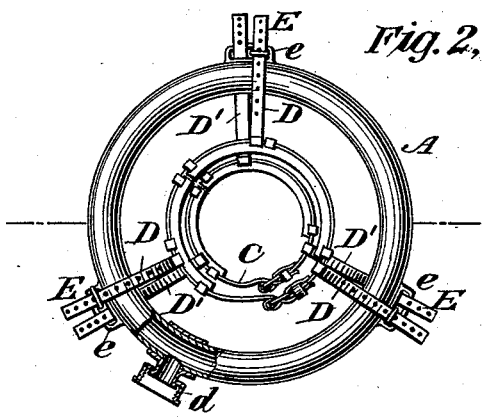

In the drawings, in which like letters designate similar parts throughout, Figure 1 is a side elevation of my invention. Fig. 2 is a plan view thereof, and Fig. 3 is a section showing one of the details.

A is a water pipe provided with perforations *a*, *b*, *c* and a pipe coupling *d* to which a hose or other pipe may be attached. The pipe A is so arranged as to surround or encircle the leg of an animal and is shown in the drawings as circular and endless in form, but this particular form is of course not essential to the invention, as other suitable forms of the encircling pipe which will readily suggest themselves may be employed.

Bails *e* are suitably secured to the pipe, each of which carries two loops E and E'. Adjustable collars B and C, above and below the pipe respectively, are attached to the loops by means of straps D and D'. These straps are each provided with a series of perforations and pass through buckles carried by the loops.

The perforations *a*, *b* and *c* are arranged to open from the interior of the pipe from different directions, the perforations *b* directing the water in the plane of the pipe and the perforations *a* and *c* directing the water obliquely above and below this plane.

As thus described, this apparatus is specially useful in bathing a bruised or swollen portion of an animal's leg. In adjusting the apparatus the collar B may be secured to the animal's leg above the knee and the collar C below or near the pastern joint, the foot having been passed through the pipe. The pipe is thus securely supported and the animal may move about without causing the pipe to strike against his leg, and the attention of an attendant is rendered unnecessary. The pipe moreover may be adjusted to any desired position between the collars by taking up and letting out the straps D and D' as required. The collar C of course need not necessarily be clasped tight around the leg. It may be quite loose and still support or hold the pipe in a substantially predetermined position with relation to the leg so that the pipe is prevented from striking it when the animal moves. It is obvious, moreover, that other means besides the collar might be employed for this purpose.

The apparatus may of course be attached to the leg of a man or the leg of any other animal, but is especially useful in bathing the legs of horses.

Various changes which will readily suggest themselves to one skilled in the art may of course be made without departing from the spirit of my invention.

Having thus described my invention, what I claim as new, and desire to secure by Letters Patent, is—

1. A shower-bath apparatus for bathing the legs of animals, comprising a spray pipe provided with a series of perforations, supports connected to said pipe arranged to be attached to the animal's body to support the pipe, and means connected to the pipe and adapted to engage the animal's leg and hold the pipe in a substantially pre-determined position in relation to the leg, whereby the pipe is prevented from striking the leg when the latter is moved, substantially as set forth.

2. A shower-bath apparatus for bathing the legs of animals, comprising a spray pipe provided with a series of perforations, supports connected to said pipe arranged to be attached to the animal's body to support the pipe, and a collar connected to the pipe and adapted to engage the animal's leg and hold the pipe in a substantially predetermined position in relation to the leg, whereby the pipe is prevented from striking the leg when the latter is moved, substantially as set forth.

3. In a shower bath apparatus, the combination of an encircling pipe provided with perforations around its inner periphery,—and an adjustable supporting collar adapted to be clasped around the leg of an animal, and adjustable connections between the collar and pipe whereby the pipe may be supported by said collar in close proximity to the leg of the animal, substantially as set forth.

4. In a shower bath apparatus, the combination of a pipe provided with perforations along its inner periphery,—a collar located above the pipe and adjustable connections between the pipe and collar, and a second collar located below the pipe and adjustable connections between the second collar and pipe, substantially as set forth.

HENRY M. CHRISTOPHER.

Witnesses:
NICHOLAS M. GOODLETT,
SIDNEY MANN.